US012699878B2

(12) United States Patent
Ritter et al.

(10) Patent No.: US 12,699,878 B2
(45) Date of Patent: Aug. 4, 2026

(54) GENERATING IMPLICIT PLANS FOR ACCOMPLISHING GOALS IN AN ENVIRONMENT USING ATTENTION OPERATIONS OVER PLANNING EMBEDDINGS

(71) Applicant: GDM Holding LLC, Mountain View, CA (US)

(72) Inventors: Samuel Ritter, London (GB); Ryan Faulkner, London (GB); David Nunes Raposo, London (GB)

(73) Assignee: GDM Holding LLC, Mountain View, CA (US)

( * ) Notice: Subject to any disclaimer, the term of this patent is extended or adjusted under 35 U.S.C. 154(b) by 856 days.

(21) Appl. No.: 17/794,780

(22) PCT Filed: Feb. 8, 2021

(86) PCT No.: PCT/EP2021/052983
§ 371 (c)(1),
(2) Date: Jul. 22, 2022

(87) PCT Pub. No.: WO2021/156513
PCT Pub. Date: Aug. 12, 2021

(65) Prior Publication Data
US 2023/0101930 A1     Mar. 30, 2023

Related U.S. Application Data

(60) Provisional application No. 62/971,444, filed on Feb. 7, 2020.

(51) Int. Cl.
G06N 3/045        (2023.01)
G06N 3/08         (2023.01)

(52) U.S. Cl.
CPC ............... *G06N 3/045* (2023.01); *G06N 3/08* (2013.01)

(58) Field of Classification Search
CPC .......... G06N 3/045; G06N 3/08; G06N 3/092
See application file for complete search history.

(56) References Cited

U.S. PATENT DOCUMENTS

2017/0024643 A1*   1/2017   Lillicrap ................ G06N 3/084
2019/0354885 A1*  11/2019   Li ........................... G06N 3/044

FOREIGN PATENT DOCUMENTS

CN       108027897 A      5/2018
CN       108701252 A     10/2018
CN       110546653 A     12/2019

OTHER PUBLICATIONS

Kuan Fang et al. "Scene Memory Transformer for Embodied Agents in Long-Horizon Tasks" (Year: 2019).*
(Continued)

*Primary Examiner* — Pei Yong Weng
(74) *Attorney, Agent, or Firm* — Fish & Richardson P.C.

(57)                ABSTRACT

Methods, systems, and apparatus, including computer programs encoded on a computer storage medium, for selecting actions to be performed by an agent interacting with an environment to accomplish a goal. In one aspect, a method comprises: generating a respective planning embedding corresponding to each of multiple experience tuples in an external memory, wherein each experience tuple characterizes interaction of the agent with the environment at a respective previous time step; processing the planning embeddings using a planning neural network to generate an implicit plan for accomplishing the goal; and selecting the action to be performed by the agent at the time step using the implicit plan.

20 Claims, 4 Drawing Sheets

(56) References Cited

OTHER PUBLICATIONS

Kuan Fang et al. âScene Memory Transformer for Embodied Agents in Long-Horizon Tasksâ (Year: 2019).*

Office Action in Chinese Appln. No. 202180013484.1, mailed on May 9, 2025, 28 pages (with English translation).

Ba et al., "Layer Normalization" Submitted on Jul. 2016, arXiv:1607:06450v1, 14 pages.

Borsa et al., "Universal successor features approximators." Submitted on Dec. 2018, arXiv:1812.07626v1, 24 pages.

Botvinick et al., "Reinforcement learning, fast and slow." Trends in cognitive sciences 23.5, May 2019, 408-422.

Dayan, "Improving generalization for temporal difference learning: The successor representation." Neural computation 5.4, Jul. 1993, 613-624.

Duan et al., "R1 ∧: Fast reinforcement learning via slow reinforcement learning." Submitted on Nov. 2016, arXiv:1611.02779v2, 14 pages.

Fang et al. "Scene Memory Transformer for Embodied Agents in Long-Horizon Tasks" Submitted on Mar. 2019, arXiv:1903.03878v1, 15 pages.

Finn et al., "Model-agnostic meta-learning for fast adaptation of deep networks." International conference on machine learning. PMLR, Jul. 2017, 10 pages.

Fortunato et al., "Generalization of reinforcement learners with working and episodic memory." Advances in neural information processing systems 32, 2019, 10 pages.

Foster et al., "Structure in the space of value functions." Machine Learning 49, Nov. 2002, 325-346.

Gregor et al., "Shaping belief states with generative environment models for rl." Advances in Neural Information Processing Systems 32, 2019, 13 pages.

Guez et al., "An investigation of model-free planning." Submitted on Jan. 2019, arXiv:1901.03559v1, 20 pages.

Gupta et al., "Cognitive mapping and planning for visual navigation." Proceedings of the IEEE conference on computer vision and pattern recognition, 2017, 10 pages.

International Preliminary Report on Patentability in International Appln. No. PCT/EP2021/052983, mailed on Aug. 18, 2022, 10 pages.

International Search Report and Written Opinion in International Appln. No. PCT/EP2021/052983, mailed on May 20, 2021, 16 pages.

Kool et al., "Attention, learn to solve routing problems!" Submitted on Feb. 2019, arXiv:1803.08475, 25 pages.

Lake et al., "Building machines that learn and think like people." Submitted on Nov. 2016, arXiv:1604.00289v3, 58 pages.

Lee et al., "Gated path planning networks." Submitted on Jun. 2018, arXiv:1806.06408v1, 12 pages.

Lee et al., "Set transformer: A framework for attention-based permutation-invariant neural networks." International conference on machine learning. PMLR, May 2019, 10 pages.

Mirowski et al., "Learning to navigate in cities without a map." Advances in neural information processing systems 31, 2018, 12 pages.

Mirowski et al., "The streetlearn environment and dataset" Submitted on Mar. 2019, arXiv:1903.01292v1, 13 pages.

Oh et al., "Control of memory, active perception, and action in minecraft." Submitted on May 2016, arXiv:1605.09128v1, 22 pages.

Ritter et al., "Been there, done that: Meta-learning with episodic recall." Submitted on Jul. 2018, arXiv:1805.09692v2, 10 pages.

Savinov et al., "Semi-parametric topological memory for navigation." Submitted on Mar. 2018, arXiv:1803.00653v1, 16 pages.

Schaul et al., "Universal value function approximators" In International Conference on Machine Learning, Jun. 2015, 9 pages.

Schrittwieser et al., "Mastering atari, go, chess and shogi by planning with a learned model." Submitted on Feb. 2020, arXiv:1911.08265v2, 21 pages.

Sutton et al., "Horde: A scalable real-time architecture for learning knowledge from unsupervised sensorimotor interaction." The 10th International Conference on Autonomous Agents and Multiagent Systems—vol. 2, May 2011, 8 pages.

Sutton et al., "Introduction to reinforcement learning" vol. 2. MIT press Cambridge, 1998, 548 pages.

Tamar et al., "Value iteration networks." Advances in neural information processing systems 29, 2016, 9 pages.

Vaswani et al., "Attention is all you need" Submitted on Jul. 2023, arXiv:1706.03762v6, 15 pages.

Vinyals et al., "Matching networks for one shot learning" In Advances in neural information processing systems, 2016, 9 pages.

Wang et al., "Learning to reinforcement learn" Submitted on Jan. 2017, arXiv:1611.05763v3, 17 pages.

Wayne et al., "Unsupervised predictive memory in a goal-directed agent." Submitted on Mar. 2018, arXiv:1803.10760v1, 57 pages.

Weber et al., "Imagination-augmented agents for deep reinforcement learning" Submitted on Feb. 2018, arXiv:1707.06203v2, 20 pages.

* cited by examiner

PLANNING NEURAL NETWORK 200

IMPLICIT PLAN
118

OBSERVATION
110

FUSION SUB-NETWORK 206

UPDATED PLANNING
EMBEDDINGS
204

ATTENTION SUB-NETWORK 202

PLANNING
EMBEDDINGS
116

300

GENERATE PLANNING EMBEDDINGS FROM EXPERIENCE TUPLES IN AN EXTERNAL MEMORY ⟋302

PROCESS PLANNING EMBEDDINGS USING PLANNING NEURAL NETWORK TO GENERATE IMPLICIT PLAN FOR ACCOMPLISHING GOAL ⟋304

SELECT ACTION TO BE PERFORMED BY AGENT USING THE IMPLICIT PLAN ⟋306

GENERATING IMPLICIT PLANS FOR ACCOMPLISHING GOALS IN AN ENVIRONMENT USING ATTENTION OPERATIONS OVER PLANNING EMBEDDINGS

CROSS-REFERENCE TO RELATED APPLICATION

This application is a National Stage Application under 35 U.S.C. § 371 and claims the benefit of International Application No. PCT/EP2021/052983, filed Feb. 8, 2021, which claims priority to U.S. Application No. 62/971,444, filed Feb. 7, 2020, the disclosure of which is incorporated herein by reference.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes an action selection system implemented as computer programs on one or more computers in one or more locations for controlling an agent interacting with an environment to accomplish a goal.

Throughout this specification, an "embedding" of an entity (e.g., an observation of an environment) can refer to a representation of the entity as an ordered collection of numerical values, e.g., a vector or matrix of numerical values. An embedding of an entity can be generated, e.g., as the output of a neural network that processes data characterizing the entity.

According to a first aspect there is provided a method performed by one or more data processing apparatus for selecting actions to be performed by an agent interacting with an environment to accomplish a goal.

The method comprises generating a respective planning embedding corresponding to, e.g. comprising a representation of, each of multiple experience tuples in an external memory, where each experience tuple characterizes interaction of the agent with the environment at a respective previous time step. Optionally the planning embedding may also include a representation, e.g. embedding, of the goal.

Thus in implementations the planning embedding characterizes previous interactions of the agent with the environment, and optionally the goal. In implementations the planning embedding does not include a representation of a current observation characterizing a current state of the environment.

The method may include processing the planning embeddings using a planning neural network to generate an implicit plan for accomplishing the goal. The implicit plan may thus comprise an embedding encoding information about the previous interactions of the agent with the environment, and optionally the goal. As described later, it may also depend on a representation of the current observation. It may implicitly characterize actions that can be performed by the agent to accomplish the goal. The planning neural network may be any neural network which is configured to process the planning embeddings, optionally a goal embedding, and in implementations the representation of the current observation. However in implementations the planning neural network may include one or more self-attention layers, as described later.

The method may further comprise selecting the action to be performed by the agent at the time step using the implicit plan.

In implementations the method iteratively updates the planning embeddings using attention over the planning embeddings, e.g. using an attention sub-network. Multiple iterations of the same attention, e.g. self-attention, function may be applied over the planning embeddings. The implicit plan may be generated based on the planning embeddings and the current observation. Generating the implicit plan may comprise appending a representation of the current embedding to each planning embedding and processing the combined embedding using one or more neural network layers e.g. self-attention layers, e.g. using the attention sub-network. In implementations these neural network layers do not process the representation of the current observation.

In broad terms using attention involves applying an attention mechanism, e.g. a self-attention mechanism which relates the planning embeddings to one another to determine the implicit plan. Details of attention mechanisms vary, but in general an attention mechanism may map a learned query vector and a learned set of key-value vector pairs to an output. The output may be computed as a weighted sum of the values, with weights dependent on a similarity of the query and key. In a self-attention mechanism of this type the input to the attention mechanism may be a set of planning embeddings and the output may the a transformed version of the same set of planning embeddings. Merely as one example, a dot-product attention mechanism is described in arXiv:1706.03762 (which also describes an example of multi-head attention). In implementations using (self-)attention facilitates determining relationships amongst past states.

In some implementations using attention over the planning embeddings involves processing the planning embeddings using a residual neural network block (i.e. one that includes a residual or skip connection). The residual neural network block may be configured to apply a sequence of operations to the planning embeddings including a layer normalization operation (see, e.g., arXiv:1607:06450), an attention operation, and a linear projection operation.

The method may involve training the planning neural network jointly with an action selection using any reinforcement learning technique e.g. by backpropagating gradients of a reinforcement learning objective function. The reinforcement learning objective function may be any suitable objective function e.g. a temporal difference objective function or a policy gradient objective function, e.g. using an actor-critic objective function, dependent upon the rewards received by the agent from the environment in response to the actions.

Particular embodiments of the subject matter described in this specification can be implemented so as to realize one or more of the following advantages.

The system described in this specification can enable an agent to use information learned about an environment to generate "implicit plans" for solving tasks (i.e., accomplishing goals) in the environment. An implicit plan refers to data (e.g., numerical data represented as an ordered collection of numerical values, e.g., a vector or matrix of numerical values) that implicitly characterizes actions that can be performed by the agent to accomplish a task. By selecting actions to be performed by the agent using implicit plans, the system described in this specification can enable the agent to accomplish tasks and explore the environment more efficiently (e.g., by accomplishing tasks and exploring the environment over fewer time steps). That is, the described techniques allow a mix of exploration and goal-directed behavior and at the same time enable the agent to learn to plan over long timescales, such that once trained the agent is able to generalize beyond its training experience. Thus in particular, the system described in this specification can enable an agent to exploit its previously gained knowledge of tasks and environments to efficiently perform new (i.e., previously unseen) tasks in new environments. In one example, the agent may be a consumer robot that performs household tasks (e.g., cleaning tasks), and the system described in this specification may enable the agent to efficiently perform new tasks as the agent is placed in new environments (e.g., different rooms in a house).

The system described in this specification can generate an implicit plan for solving a task by generating planning embeddings based on past interactions of the agent with the environment, and iteratively updating the planning embeddings using attention operations. Iteratively updating the planning embeddings using attention operations allows information to be shared amongst the planning embeddings and thereby facilitates more effective planning which can enable the agent to accomplish tasks and explore the environment more efficiently, e.g., over fewer time steps.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
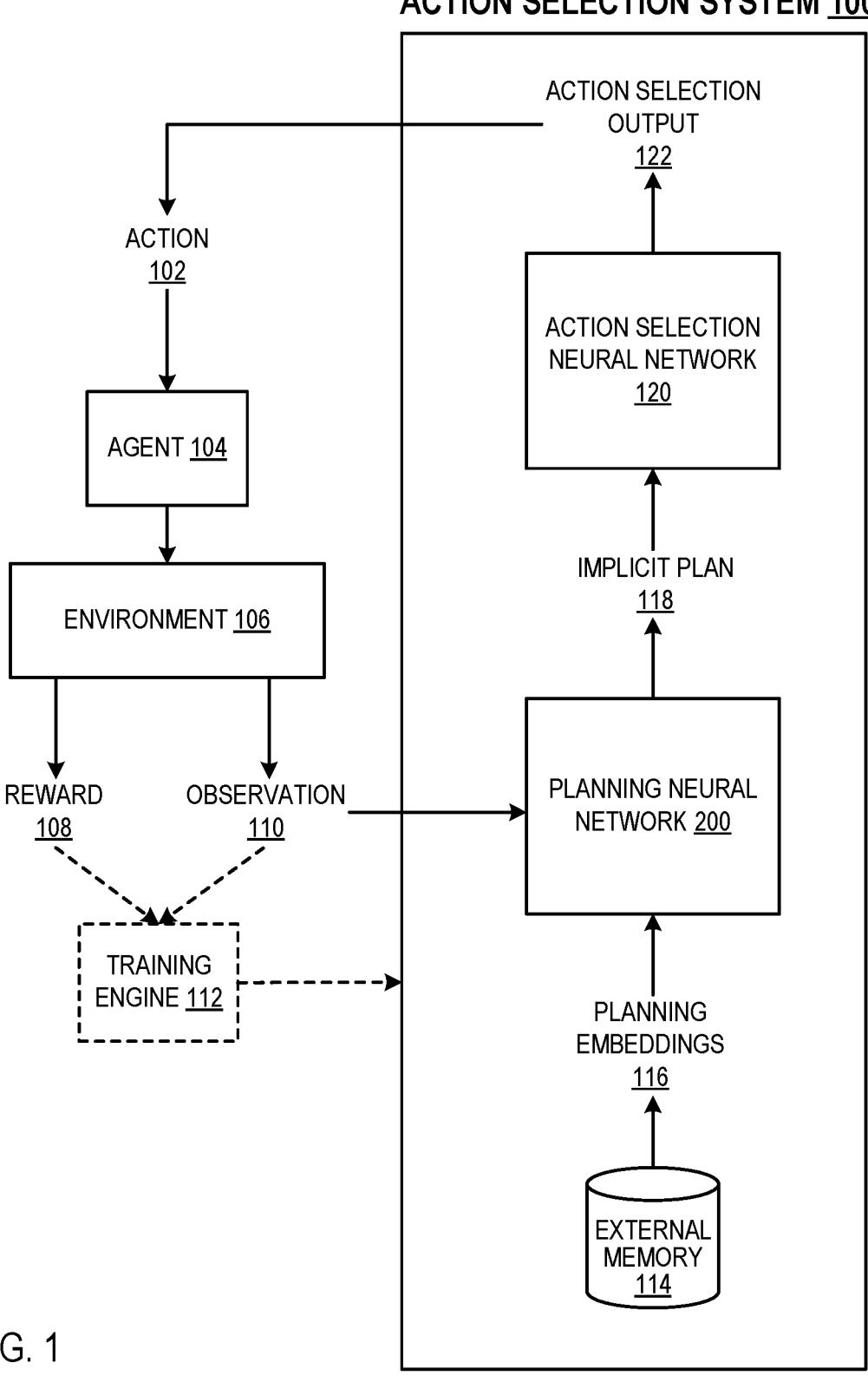
FIG. 1 is a block diagram of an example action selection system.

FIG. 1 is a block diagram of an example action selection system 100. The action selection system 100 is an example of a system implemented as computer programs on one or more computers in one or more locations in which the systems, components, and techniques described below are implemented.

The system 100 selects actions 102 to be performed by an agent 104 interacting with an environment 106 at each of multiple time steps to accomplish a goal. At each time step, the system 100 receives data characterizing the current state of the environment 106, e.g., an image of the environment 106, and selects an action 102 to be performed by the agent 104 in response to the received data. Data characterizing a state of the environment 106 will be referred to in this specification as an observation 110. At each time step, the state of the environment 106 at the time step (as characterized by the observation 110) depends on the state of the environment 106 at the previous time step and the action 102 performed by the agent 104 at the previous time step.

At each time step, the system 100 may receive a reward 108 based on the current state of the environment 106 and the action 102 of the agent 104 at the time step. Generally, the reward 108 may be represented a numerical value. The reward 108 can be based on any event in or aspect of the environment 106. For example, the reward 108 may indicate whether the agent 104 has accomplished a goal (e.g., navigating to a target location in the environment 106) or the progress of the agent 104 towards accomplishing a goal.

In some implementations, the environment is a real-world environment and the agent is a mechanical agent interacting with the real-world environment. For example, the agent may be a robot interacting with the environment to accomplish a goal, e.g., to locate an object of interest in the environment, to move an object of interest to a specified location in the environment, to physically manipulate an object of interest in the environment in a specified way, or to navigate to a specified destination in the environment; or the agent may be an autonomous or semi-autonomous land, air, or sea vehicle navigating through the environment to a specified destination in the environment. Then the actions may be actions taken by the mechanical agent in the real-world environment to accomplish the goal, and may include control signals to control the mechanical agent.

In these implementations, the observations may include, for example, one or more of images, object position data, and sensor data to capture observations as the agent interacts with the environment, for example sensor data from an image, distance, or position sensor or from an actuator.

For example in the case of a robot the observations may include data characterizing the current state of the robot, e.g., one or more of: joint position, joint velocity, joint force, torque or acceleration, for example gravity-compensated torque feedback, and global or relative pose of an item held by the robot.

In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations.

The observations may also include, for example, data obtained by one of more sensor devices which sense a real-world environment; for example, sensed electronic signals such as motor current or a temperature signal; and/or image or video data for example from a camera or a LIDAR sensor, e.g., data from sensors of the agent or data from sensors that are located separately from the agent in the environment.

In the case of an electronic agent the observations may include data from one or more sensors monitoring part of a plant or service facility such as current, voltage, power, temperature and other sensors and/or electronic signals representing the functioning of electronic and/or mechanical items of equipment.

The actions may be control inputs to control a robot, e.g., torques for the joints of the robot or higher-level control commands, or the autonomous or semi-autonomous land or air or sea vehicle, e.g., torques to the control surface or other control elements of the vehicle or higher-level control commands.

In other words, the actions can include for example, position, velocity, or force/torque/acceleration data for one or more joints of a robot or parts of another mechanical agent. Actions may additionally or alternatively include electronic control data such as motor control data, or more generally data for controlling one or more electronic devices within the environment the control of which has an effect on the observed state of the environment. For example in the case of an autonomous or semi-autonomous land, air, or sea vehicle the actions may include actions to control navigation e.g. steering, and movement e.g., braking and/or acceleration of the vehicle.

In some implementations the environment is a simulated environment, e.g. a simulation of the above described real-world environment, and the agent is implemented as one or more computers interacting with the simulated environment. For example the simulated environment may be a simulation of a robot or vehicle and the reinforcement learning system may be trained on the simulation and then, once trained, used in the real-world.

For example, the simulated environment may be a motion simulation environment, e.g., a driving simulation or a flight simulation, and the agent may be a simulated vehicle navigating through the motion simulation. In these implementations, the actions may be control inputs to control the simulated user or simulated vehicle.

In another example, the simulated environment may be a video game and the agent may be a simulated user playing the video game.

In a further example the simulated environment may be a protein folding environment such that each state is a respective state of a protein chain and the agent is a computer system for determining how to fold the protein chain. In this example, the actions are possible folding actions for folding the protein chain and the goal to be achieved may include, e.g., folding the protein so that the protein is stable and so that it achieves a particular biological function.

Generally in the case of a simulated environment the observations may include simulated versions of one or more of the previously described observations or types of observations and the actions may include simulated versions of one or more of the previously described actions or types of actions.

In some cases, the action selection system 100 can be used to control the interactions of the agent with a simulated environment, and a training engine can train the parameters of the action selection system (e.g., using reinforcement learning techniques) based on the interactions of the agent with the simulated environment. After the action selection system is trained based on the interactions of the agent with a simulated environment, the agent can be deployed in a real-world environment, and the trained action selection system can be used to control the interactions of the agent with the real-world environment. Training the action selection system based on interactions of the agent with a simulated environment (i.e., instead of a real-world environment) can avoid wear-and-tear on the agent and can reduce the likelihood that, by performing poorly chosen actions, the agent can damage itself or aspects of its environment.

In some other applications the agent may control actions in a real-world environment including items of equipment, for example in a data center or grid mains power or water distribution system, or in a manufacturing plant or service facility. The observations may then relate to operation of the plant or facility. For example the observations may include observations of power or water usage by equipment, or observations of power generation or distribution control, or observations of usage of a resource or of waste production. The agent may control actions in the environment to accomplish the goal of increased efficiency, for example by reducing resource usage, and/or reduce the environmental impact of operations in the environment, for example by reducing waste. The actions may include actions controlling or imposing operating conditions on items of equipment of the plant/facility, and/or actions that result in changes to settings in the operation of the plant/facility e.g. to adjust or turn on/off components of the plant/facility.

In some further applications, the environment is a real-world environment and the agent manages distribution of tasks across computing resources e.g. on a mobile device and/or in a data center. In these implementations, the actions may include assigning tasks to particular computing resources, and the goal to be achieved can include minimizing the time required to complete a set of tasks using specified computing resources.

As a further example, the actions may include presenting advertisements, the observations may include advertisement impressions or a click-through count or rate, and the reward may characterize previous selections of items or content taken by one or more users. In this example, the goal to be achieved can include maximizing selections of item or content by the one or more users.

Optionally, in any of the above implementations, the observation at any given time step may include data from a previous time step that may be beneficial in characterizing the environment, e.g., the action performed at the previous time step, the reward received at the previous time step, and so on.

The system 100 selects the action to be performed by the agent 104 at each time step using an external memory 114, a planning neural network 200, and an action selection neural network 120, as will be described in more detail next.

The memory 114 stores a respective "experience tuple" corresponding to each of multiple previous time steps (e.g., the memory 114 can store a respective experience tuple for each time step before the current time step). The memory 114 can be implemented, e.g., as a logical data storage area or physical data storage device.

An experience tuple for a time step refers to data that characterizes the interaction of the agent 104 with the environment 106 at the previous time step. For example, an experience tuple for a previous time step can include respective embeddings (representations) of: (i) the observation at the previous time step, (ii) the action performed by the agent at the previous time step, and (iii) the subsequent observation that resulted from the action performed by the agent at the previous time step.

The system 100 can generate an embedding of an observation (e.g., that is included in an experience tuple) by providing the observation to an embedding neural network that is configured to process the observation to generate a corresponding embedding. The system 100 can generate an embedding of an action (e.g., that is included in an experience tuple) by associating the action with a one-hot embedding that uniquely identifies the action from a set of possible actions.

In some implementations, the system 100 clears the memory 114 (i.e., by deleting or overwriting the contents of the memory 114) each time a clearing criterion is satisfied. For example, the clearing criterion can be satisfied if the agent accomplishes the goal in the environment, if the agent is placed in a new environment, or if the memory is full (e.g., because an experience tuple is stored in each available slot in the memory).

To select the action to be performed at a time step, the system 100 generates a respective "planning" embedding 116 corresponding to each of multiple experience tuples stored in the memory 114. In some implementations, the system 100 can generate the planning embedding 116 for an experience tuple, e.g., by concatenating an embedding of a "goal" observation to the experience tuple, where the goal observation represents a state of the environment when the goal of the agent has been accomplished. For example, if the goal of the agent is to navigate to a specified location in the environment, then the goal observation may be an observation representing the state of the environment when the agent is located at the specified location. In some other implementations, the system 100 can identify the planning embedding 116 associated with an experience tuple as being a copy of the experience tuple (e.g., such that the planning embeddings 116 and the experience tuples stored in the memory 114 are the same).

The system 100 can generate a respective planning embedding 116 corresponding to each experience tuple stored in the memory 114. Alternatively, the system 100 can generate planning embeddings 116 for only a proper subset of the experience tuples stored in the memory 114, e.g., for only the experience tuples corresponding to a predetermined number L of most recent time steps. (L can be any appropriate positive integer value, e.g., L=5).

The planning neural network 200 is configured to process: (i) the planning embeddings 116 representing previous interactions of the agent with the environment, and (ii) a current observation 110 representing the current state of the environment, to generate an "implicit plan" 118 for accomplishing the goal of the agent. The implicit plan 118 is an embedding that can encode information about the current state of the environment (from the current observation 110), the history of the interaction of the agent with the environment (from the planning embeddings 116), and optionally, the goal to be accomplished by the agent (also from the planning embeddings 116).

The planning neural network 200 can have any appropriate neural network architecture that enables it to perform its described functions. As part of generating the implicit plan 118 from the planning embeddings 116, the planning neural network 200 can enrich the planning embeddings by updating the planning embedding using self-attention operations. An example architecture of the planning neural network 200 is described in more detail with reference to FIG. 2.

The action selection neural network 120 is configured to process an input that includes the implicit plan 118 generated by the planning neural network 200 to generate an action selection output 122. Optionally, the action selection neural network 120 can process other data in addition to the implicit plan 118, e.g., the action selection neural network 120 can also process respective embeddings of one or more of: the current observation, the action performed at the previous time step, or the reward received at the previous time step. The action selection output 122 can include a respective score for each action in a set of possible actions that can be performed by the agent.

The system 100 selects the action 102 to be performed by the agent 104 at the time step using the action selection output 122 generated by the action selection neural network 120 at the time step. For example, the system 100 can select the action having the highest score, according to the action selection output 122, as the action to be performed by the agent at the time step. In some implementations, the system 100 selects the action to be performed by the agent in accordance with an exploration strategy. For example, the system 100 can use an ε-greedy exploration strategy. In this example, the system 100 can select the action having a highest score (according to the action selection output 122) with probability 1−ε, and select an action randomly with probability ε, where ε is a number between 0 and 1.

The action selection neural network 120 can have any appropriate neural network architecture that enables it to perform its described functions. For example, the action selection neural network can include any appropriate neural network layers (e.g., convolutional layers, fully connected layers, attention layers, etc.) connected in any appropriate configuration (e.g., as a linear sequence of layers). In one example, the action selection neural network 120 can include: an input layer that is configured to receive the implicit plan 118, a linear sequence of multiple fully-connected layers, and an output layer that includes a respective neuron corresponding to each action in the set of possible actions that can be performed by the agent.

After the system 100 selects the action 102 to be performed by the agent 104 at the time step, the agent 104 interacts with the environment 106 by performing the action 102, and the system 100 can receive a reward 108 based on the interaction. The system 100 can generate an experience tuple characterizing the interaction of the agent with the environment at the time step, and store the experience tuple in the memory 114.

A training engine 112 can use the observations 110 and corresponding rewards 108 resulting from the interactions of the agent 104 with the environment 106 to train the action selection system 100 using reinforcement learning techniques. The training engine 112 trains the action selection system 100 by iteratively adjusting the parameters of the action selection neural network 120 and the planning neural network 200. The training engine 112 can adjust the parameters of the action selection system 100 by iteratively backpropagating gradients of a reinforcement learning objective function through the action selection system 100. By training the action selection system 100, the training engine 112 can cause the action selection system 100 to select actions that increase a cumulative measure of reward (e.g., a long-term time-discounted cumulative reward) received by the action selection system 100 and cause the agent to accomplish its goal more effectively (e.g., over fewer time steps).

Figure 2:
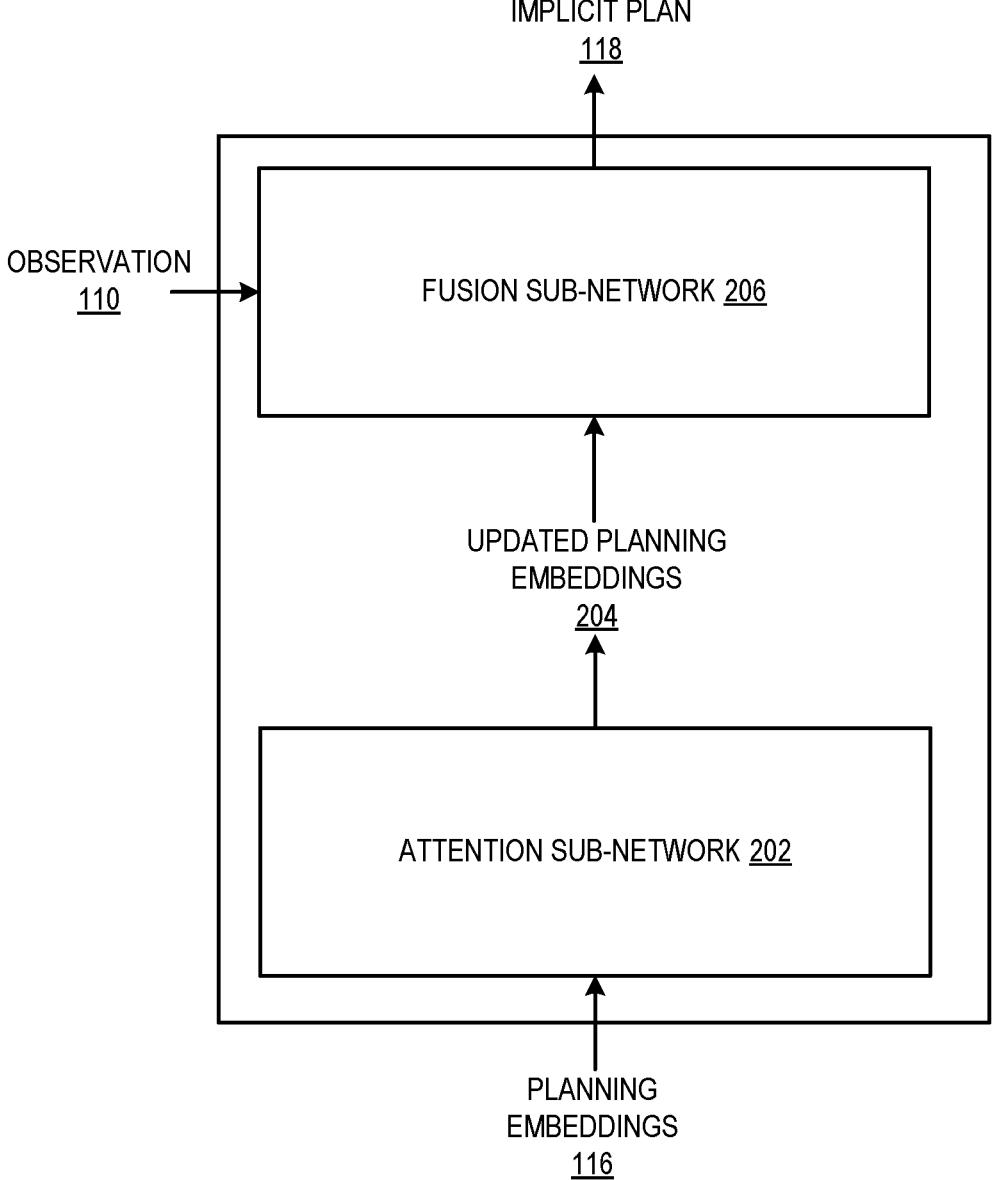
FIG. 2 shows an example architecture of a planning neural network that is included in the action selection system.

FIG. 2 shows an example architecture of a planning neural network 200 that is included in the action selection system 100 described with reference to FIG. 1.

The planning neural network 200 is configured to process: (i) a set of planning embeddings 116 representing previous interactions of the agent with the environment, and (ii) a current observation 110 representing the current state of the environment, to generate an implicit plan 118 for accomplishing the goal of the agent.

The planning neural network 200 includes an attention sub-network 202 and a fusion sub-network 206, which will each be described in more detail next.

The attention sub-network 202 is configured to iteratively (i.e., at each of one or more iterations) update the planning embeddings 116 to generate updated planning embeddings 204. More specifically, the attention sub-network 202 iteratively updates the planning embeddings 116 by processing the planning embeddings 116 using a sequence of one or more "attention blocks." Each attention block is a collection of one or more neural network layers that is configured to receive a set of current planning embeddings, to update the current planning embeddings by applying attention operations to the current planning embeddings, and to output the updated planning embeddings. The first attention block can receive the initial planning embeddings 116, each subsequent attention block can receive the planning embeddings output by the preceding attention block, and the final attention block can output the updated planning embeddings 204 (i.e., that define the output of the attention sub-network 202).

Each attention block updates the planning embeddings by applying attention operations to the planning embeddings, in particular, by updating each planning embedding using self-attention over the planning embeddings. To update a given planning embedding using self-attention over the planning embeddings, the attention block can determine a respective "attention weight" between the given planning embedding and each planning embedding in the set of planning embeddings. The attention block can then update the given planning embedding using: (i) the attention weights, and (ii) the planning embeddings.

For example, if the planning embeddings 116 are denoted by $$\{p_i\}_{i=1}^N,$$

where N is the number of planning embeddings, then to update planning embedding $p_i$, an attention block can determine attention weights $$[a_{i,j}]_{j=1}^N$$

where $a_{i,j}$ denotes the attention weight between $p_i$ and $p_j$, as:

$$[a_{i,j}]_{j=1}^N = \text{softmax}\left(\frac{(W_q p_i)K^T}{c}\right) \qquad (1)$$

$$K^T = [W_k p_j]_{j=1}^N \qquad (2)$$

where $W_q$ and $W_k$ are learned parameter matrices, softmax(•) denotes a soft-max normalization operation, and c is a constant. Using the attention weights, the attention block can update planning embedding $p_i$ as:

$$p_i \leftarrow \sum_{j=1\ldots N} a_{i,j} \cdot (W_v p_j) \qquad (3)$$

where $W_v$ is a learned parameter matrix. ($W_q p_i$ can be referred to as the "query embedding" for planning embedding $p_i$, $W_k p_j$ can be referred to as the "key embedding" for planning embedding $p_j$, and $W_v p_j$ can be referred to as the "value embedding" for planning embedding $p_j$). The parameter matrices $W_q$ (the "query embedding matrix"), $W_k$ (the "key embedding matrix"), and $W_v$ (the "value embedding matrix") are trainable parameters of the attention block. Generally, each attention block in the attention sub-network 202 can use query, key, and value embedding matrices with different parameter values to update the planning embeddings.

Optionally, each attention block can have multiple "heads" that each generate a respective updated planning embedding corresponding to each input planning embedding, i.e., such that each input planning embedding is associated with multiple updated planning embeddings. For example, each head may generate updated planning embeddings in accordance with different values of the parameter matrices $W_q$, $W_k$, and $W_v$ that are described with reference to equations (1)-(3). An attention block with multiple heads can implement a "gating" operation to combine the updated planning embeddings generated by the heads for an input planning embedding, i.e., to generate a single updated planning embedding corresponding to each input planning embedding. For example, the attention block can process the input planning embeddings using one or more neural network layers (e.g., fully connected neural network layers) to generate a respective gating value for each head. The attention block can then combine the updated planning embeddings corresponding to an input planning embedding in accordance with the gating values. For example, the attention block can generate the updated planning embedding for an input planning embedding $p_i$ as:

$$\sum_{k=1}^K \alpha_k \cdot p_i^{next} \qquad (4)$$

where k indexes the heads, $\alpha_k$ is the gating value for head k, and $$p_i^{next}$$

is the updated planning embedding generated by head k for input planning embedding $p_i$. The attention operations described with reference to equations (1)-(4) can be referred as "multi-head key-query-value attention operations."

By updating the planning embeddings 116 using self-attention operations, the planning neural network 200 uses learned operations to share information amongst the planning embeddings 116 and thereby enrich each planning embedding with information content from the other planning embeddings. Enriching the information content of the planning embeddings 116 can enable the planning neural network 200 to generate more informative implicit plans 118 that enable the agent to accomplish goals in the environment more efficiently, e.g., over fewer time steps.

In some implementations, as described with reference to FIG. 1, the action selection system 100 generates planning embeddings 116 corresponding to only a proper subset of the experience tuples stored in the memory, e.g., for only the experience tuples corresponding to the L most recent time steps. To enable the planning system 100 to incorporate information from all the stored experience tuples (i.e., in addition to only the L most recent experience tuples), the action selection system 100 can generate a respective "static" embedding corresponding to each experience tuple stored in the memory. The action selection system 100 can generate a static embedding corresponding to an experience tuple, e.g., by concatenating an embedding of a goal observation to the experience tuple. After generating the static embeddings for the experience tuples stored in the memory, the action selection system 100 can then provide the static embeddings to the planning system 100 in addition to the planning embeddings 116.

Each attention block of the attention sub-network 202 can update the planning embeddings using cross-attention over the static embeddings, in addition to using self-attention over the planning embeddings themselves (as described above). For example, each attention block can first update the planning embeddings using cross-attention over the static embeddings, and then update the planning embeddings using self-attention over the planning embeddings. Generally, the attention blocks of the attention sub-network 202 do not update the static embeddings, i.e., such that the static embeddings remain fixed even as the planning embeddings are updated by each attention block of the attention sub-network 202.

To update a given planning embedding using cross-attention over the static embeddings, an attention block can determine a respective attention weight between the given planning embedding and each static embedding. The attention block can then update the given planning embedding using: (i) the attention weights, and (ii) the static embeddings. For example, if the planning embeddings 116 are denoted by $$\{p_i\}_{i=1}^L$$

and the static embeddings are denoted by $$\{s_j\}_{j=1}^M,$$

then to update planning embedding $p_i$, an attention block can determine attention weights $$[a_{i,j}]_{j=1}^M$$

where $a_{i,j}$ denotes the attention weight between $p_i$ and $s_j$, as:

$$[a_{i,j}]_{j=1}^M = \mathrm{softmax}\left(\frac{(W_q p_i)K^T}{c}\right) \tag{5}$$

$$K^T = [W_k s_j]_{j=1}^M \tag{6}$$

where $W_q$ and $W_k$ are learned parameter matrices, softmax($\cdot$) denotes a soft-max normalization operation, and $c$ is a constant. Using the attention weights, the attention block can update planning embedding $p_i$ as:

$$p_i \leftarrow \sum_{j=1\ldots M} a_{i,j} \cdot (W_v s_j) \tag{7}$$

where $W_v$ is a learned parameter matrix. Optionally, the attention block can have multiple heads that generate multiple updated planning embeddings corresponding to each input planning embedding using cross-attention over the static embeddings. The attention block can combine the multiple updated planning embeddings corresponding to each input planning embedding to generate a single updated planning embedding corresponding to each input planning embedding, as described above.

By updating the planning embeddings 116 using cross-attention over static embeddings for every experience tuple in the external memory, the planning neural network 200 can efficiently capture information from all of the previous interactions of the agent with environment and thereby generate a more informative implicit plan. The action selection system can use the more informative implicit plan to select actions that enable the agent to accomplish goals in the environment more effectively, e.g., over fewer time steps. By refraining from updating the static embeddings, e.g., using attention operations, the planning neural network can significantly reduce consumption of computational resources (e.g., memory and computing power).

Each attention block can implement any other appropriate neural network operations in addition to the attention operations described above to update the current planning embeddings. For example, each attention block can be a residual block that processes current planning embeddings $B_i$ to generate updated planning embeddings $B_{i+1}$ as follows:

$$B_{i+1} = f(B_i + MHA(LayerNorm(B_i))) \tag{8}$$

where LayerNorm($\cdot$) denotes a layer normalization operation, MHA($\cdot$) denotes a multi-head attention operation (including self-attention over the planning embeddings $B_i$, and optionally, cross attention over the static embeddings), and f($\cdot$) denotes a linear projection operation.

The fusion sub-network 206 is configured to process: (i) the updated planning embeddings 204, and (ii) the current observation 110, to generate the implicit plan 118 for accomplishing the goal. Generally, the fusion sub-network 206 can have any appropriate neural network architecture that enables it to perform its described function, including any appropriate neural network layers (e.g., convolutional layers or fully-connected layers) connected in any appropriate configuration (e.g., as a linear sequence of layers).

For example, to generate the implicit plan 118, the fusion sub-network 206 can generate an embedding of the current observation 110, e.g., by processing the current observation 110 using an embedding neural network. The fusion sub-network 206 can then append (concatenate) the embedding of the current observation 110 to each updated planning embedding 204 to generate a respective "combined" embedding corresponding to each updated planning embedding 204. The fusion sub-network 206 can process each combined embedding using one or more neural network layers (e.g., fully-connected layers) to generate a respective "transformed" embedding corresponding to each updated planning embedding 204. The fusion sub-network 206 can generate the implicit plan by applying a pooling operation to the transformed embeddings. The pooling operation can be any appropriate operation that, when applied to the transformed embeddings, generates an implicit plan having a dimensionality that is independent of the number of transformed embeddings. For example, the pooling operation can be a feature-wise max pooling operation, i.e., where the implicit plan is defined as having the same dimensionality as each transformed embedding, and each entry of the implicit plan is defined as the maximum of the corresponding entries of the transformed embeddings.

The parameters of the planning neural network 200, including the parameters of the attention sub-network 202 (including its constituent attention blocks) and the fusion sub-network 206, are jointly trained along with the parameters of the action selection neural network 120 by a training engine using reinforcement learning techniques (as described with reference to FIG. 1). In particular, the gradients of a reinforcement learning objective function are backpropagated through the action selection neural network and into the fusion sub-network and the attention sub-network of the planning neural network. These gradients are used to adapt the parameters of the planning neural network to enable the generation of implicit plans encoding information that, when processed by the action selection neural network, result in the selection of actions that allow the agent to effectively accomplish goals in the environment.

Figure 3:
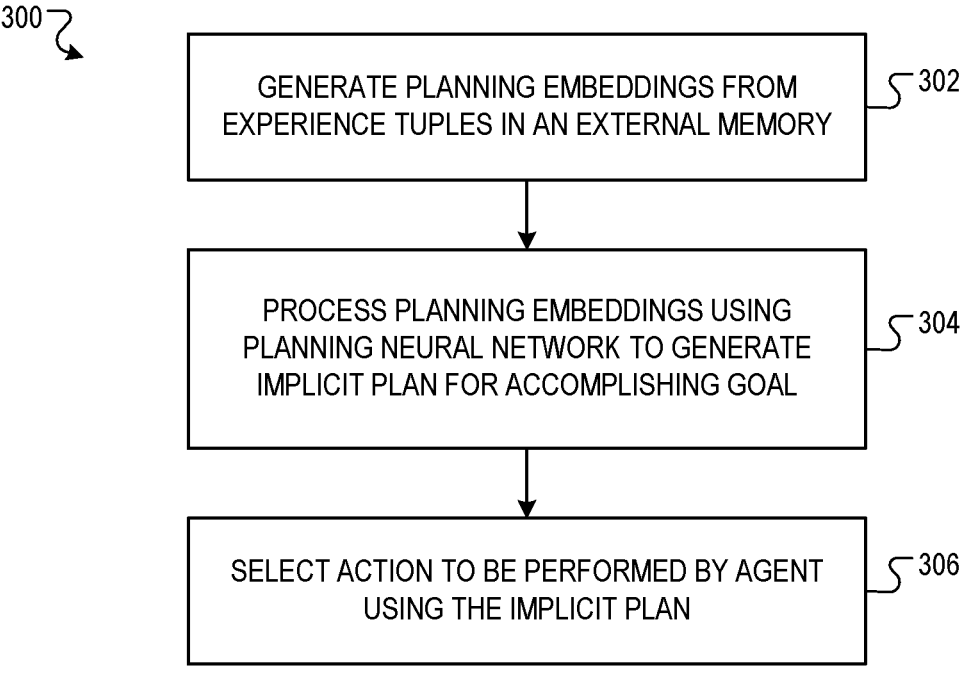
FIG. 3 is a flow diagram of an example process for selecting actions to be performed by an agent interacting with an environment to accomplish a goal.

FIG. 3 is a flow diagram of an example process 300 for selecting actions to be performed by an agent interacting with an environment to accomplish a goal. For convenience, the process 300 will be described as being performed by a system of one or more computers located in one or more locations. For example, an action selection system, e.g., the action selection system 100 of FIG. 1, appropriately programmed in accordance with this specification, can perform the process 300.

The system generates a respective planning embedding corresponding to each of multiple experience tuples in an external memory (302). Each experience tuple characterizes interaction of the agent with the environment at a respective previous time step.

The system processes the planning embeddings using a planning neural network to generate an implicit plan for accomplishing the goal (304).

The system selects the action to be performed by the agent at the time step using the implicit plan (306).

Figure 4:
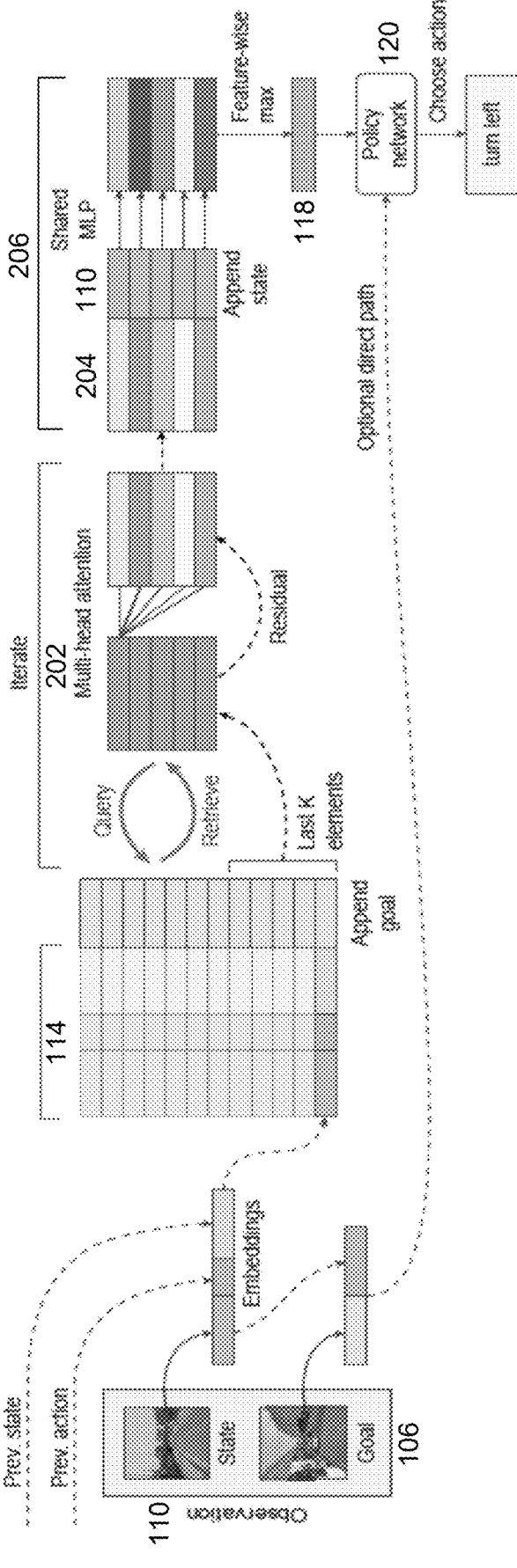
FIG. 4 is a schematic illustration of an example of the system of FIG. 1.

FIG. 4 a schematic illustration of an example of the system of FIG. 1, in which like elements to those previously described are indicated by like reference numerals.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method performed by one or more data processing apparatus for selecting actions to be performed by an agent interacting with an environment to accomplish a goal, the method comprising:

receiving data identifying a task to be performed by the agent, wherein the task comprises causing a state of the environment to transition into a goal state;

generating a representation of the goal state;

generating a respective planning embedding corresponding to each of multiple experience tuples in an external memory, wherein each experience tuple characterizes an interaction of the agent with the environment at a respective previous time step, wherein generating the planning embeddings for the experience tuples comprises:

appending the same generated representation of the goal state of the environment to each of the experience tuples;

generating an implicit plan for accomplishing the goal by processing, using a planning neural network, (i) the planning embeddings, and (ii) a current observation characterizing a current state of the environment; and selecting the action to be performed by the agent at the time step using the implicit plan, wherein:

(i) the agent is a mechanical agent, and the actions include control signals for actions taken by the mechanical agent in the environment to accomplish the goal, or (ii) the environment includes items of equipment in a plant or facility and the agent controls actions in the environment, the actions controlling or imposing operating conditions on the items of equipment of the plant/facility, or (iii) the agent manages distribution of tasks across computing resources in the environment, and the actions include assigning tasks to particular computing resources.

2. The method of claim 1, wherein processing the planning embeddings using a planning neural network to generate an implicit plan for accomplishing the goal comprises:

iteratively updating the planning embeddings, comprising, at each of a plurality of iterations, updating each planning embedding using attention over the planning embeddings; and generating the implicit plan using the planning embeddings.

3. The method of claim 2, further comprising generating a respective static embedding corresponding to each of multiple experience tuples in the external memory;

wherein iteratively updating the planning embeddings further comprises, at each of the plurality of iterations: updating each planning embedding using attention over the static embeddings.

4. The method of claim 3, wherein:

generating a respective planning embedding corresponding to each of multiple experience tuples in the external memory comprises:

generating a respective planning embedding only for experience tuples in the external memory characterizing interaction of the agent with the environment over a predetermined number of most recent time steps; and generating a respective static embedding corresponding to each of multiple experience tuples in the external memory comprises:

generating a respective static embedding for every experience tuple in the external memory.

5. The method of claim 2, wherein updating each planning embedding using attention over the planning embeddings comprises:

processing the planning embeddings using a residual neural network block that is configured to apply a sequence of operations to the planning embeddings, the sequence of operations comprising: (i) a layer normalization operation, (ii) an attention operation, and (iii) a linear projection operation.

6. The method of claim 5, wherein the attention operation comprises a multi-head key-query-value attention operation over the planning embeddings.

7. The method of claim 2, wherein generating the implicit plan using the planning embeddings comprises:

generating the implicit plan based on: (i) the planning embeddings, and (ii) a current observation characterizing a current state of the environment.

8. The method of claim 7, wherein generating the implicit plan based on: (i) the planning embeddings, and (ii) a current observation characterizing a current state of the environment comprises:

for each planning embedding:

appending a representation of the current observation to the planning embedding to generate a combined embedding; and processing the combined embedding by one or more neural network layers to generate a transformed embedding; and generating the implicit plan based on the transformed embeddings.

9. The method of claim 8, wherein generating the implicit plan based on the transformed embeddings comprises:

generating the implicit plan by applying a pooling operation to the transformed embeddings.

10. The method of claim 9, wherein the pooling operation is a feature-wise max pooling operation.

11. The method of claim 1, wherein selecting the action to be performed by the agent at the time step using the implicit plan comprises:

processing an input comprising the implicit plan using an action selection neural network to generate an action selection output; and selecting the action based on the action selection output.

12. The method of claim 11, wherein the action selection output comprises a respective score for each action in a set of possible actions that can be performed by the agent, and selecting the action based on the action selection output comprises sampling an action in accordance with the action scores.

13. The method of claim 11, wherein the action selection neural network and the planning neural network are trained using reinforcement learning techniques to maximize a cumulative measure of reward received by the agent by interacting with the environment.

14. The method of claim 1, wherein each experience tuple comprises: (i) a representation of an observation characterizing a state of the environment at the respective previous time step, (ii) a representation of an action performed by the agent at the respective previous time step, and (iii) a representation of an observation characterizing the state of the environment after the agent performed the action at the respective previous time step.

15. The method of claim 1, further comprising, after selecting the action to be performed by the agent at the time step using the implicit plan, storing an experience tuple in the external memory that characterizes interaction of the agent with the environment at a current time step.

16. A system comprising:

one or more computers; and one or more storage devices communicatively coupled to the one or more computers, wherein the one or more storage devices store instructions that, when executed by the one or more computers, cause the one or more computers to perform operations for selecting actions to be performed by an agent interacting with an environment to accomplish a goal, the operations comprising:

receiving data identifying a task to be performed by the agent, wherein the task comprises causing a state of the environment to transition into a goal state;

generating a representation of the goal state;

generating a respective planning embedding corresponding to each of multiple experience tuples in an external memory, wherein each experience tuple characterizes an interaction of the agent with the environment at a respective previous time step, wherein generating the planning embeddings for the experience tuples comprises:

appending the same generated representation of the goal state of the environment to each of the experience tuples;

generating an implicit plan for accomplishing the goal by processing, using a planning neural network, (i) the planning embeddings, and (ii) a current observation characterizing a current state of the environment; and selecting the action to be performed by the agent at the time step using the implicit plan, wherein:

(i) the agent is a mechanical agent, and the actions include control signals for actions taken by the mechanical agent in the environment to accomplish the goal, or (ii) the environment includes items of equipment in a plant or facility and the agent controls actions in the environment, the actions controlling or imposing operating conditions on the items of equipment of the plant/facility, or (iii) the agent manages distribution of tasks across computing resources in the environment, and the actions include assigning tasks to particular computing resources.

17. One or more non-transitory computer storage media storing instructions that when executed by one or more computers cause the one or more computers to perform operations for selecting actions to be performed by an agent interacting with an environment to accomplish a goal, the operations comprising:

receiving data identifying a task to be performed by the agent, wherein the task comprises causing a state of the environment to transition into a goal state;

generating a representation of the goal state;

generating a respective planning embedding corresponding to each of multiple experience tuples in an external memory, wherein each experience tuple characterizes an interaction of the agent with the environment at a respective previous time step, wherein generating the planning embeddings for the experience tuples comprises:

appending the same generated representation of the goal state of the environment to each of the experience tuples;

generating an implicit plan for accomplishing the goal by processing, using a planning neural network, (i) the planning embeddings, and (ii) a current observation characterizing a current state of the environment; and selecting the action to be performed by the agent at the time step using the implicit plan, wherein:

(i) the agent is a mechanical agent, and the actions include control signals for actions taken by the mechanical agent in the environment to accomplish the goal, or (ii) the environment includes items of equipment in a plant or facility and the agent controls actions in the environment, the actions controlling or imposing operating conditions on the items of equipment of the plant/facility, or (iii) the agent manages distribution of tasks across computing resources in the environment, and the actions include assigning tasks to particular computing resources.

18. The non-transitory computer storage media of claim 17, wherein processing the planning embeddings using a planning neural network to generate an implicit plan for accomplishing the goal comprises:

iteratively updating the planning embeddings, comprising, at each of a plurality of iterations, updating each planning embedding using attention over the planning embeddings; and generating the implicit plan using the planning embeddings.

19. The non-transitory computer storage media of claim 17, the operations further comprising generating a respective static embedding corresponding to each of multiple experience tuples in the external memory;

wherein iteratively updating the planning embeddings further comprises, at each of the plurality of iterations:

updating each planning embedding using attention over the static embeddings.

20. The non-transitory computer storage media of claim 19, the operations further comprising generating a respective static embedding corresponding to each of multiple experience tuples in the external memory;

wherein iteratively updating the planning embeddings further comprises, at each of the plurality of iterations:

updating each planning embedding using attention over the static embeddings.

* * * * *